No. 827,632. PATENTED JULY 31, 1906.
H. S. HART, O. W. MEISSNER & J. O. NEIKIRK.
RAILWAY CAR.
APPLICATION FILED MAR. 8, 1905.

Witnesses:
C. E. Gaylord,
John Enders,

Inventors:
Harry Stillson Hart,
Otto William Meissner &
John Oscar Neikirk,
By Thomas F. Sheridan,
Att'ys No. 827,632. PATENTED JULY 31, 1906.
H. S. HART, O. W. MEISSNER & J. O. NEIKIRK.
RAILWAY CAR.
APPLICATION FILED MAR. 8, 1905.

No. 827,632. PATENTED JULY 31, 1906.
H. S. HART, O. W. MEISSNER & J. O. NEIKIRK.
RAILWAY CAR.
APPLICATION FILED MAR. 8, 1905.

No. 827,632. PATENTED JULY 31, 1906.
H. S. HART, O. W. MEISSNER & J. O. NEIKIRK.
RAILWAY CAR.
APPLICATION FILED MAR. 8, 1905.

Witnesses:
Inventors:
Harry Stillson Hart,
Otto William Meissner &
John Oscar Neikirk,
By Thomas F. Sheridan,
Att'y

No. 827,632. PATENTED JULY 31, 1906.
H. S. HART, O. W. MEISSNER & J. O. NEIKIRK.
RAILWAY CAR.
APPLICATION FILED MAR. 8, 1905.

Inventors:
Harry Stillson Hart,
Otto William Meissner and
John Oscar Neikirk,
By Thomas F. Sheridan,
Att'y Witnesses:
Chas. E. Gaylord.
John Enders.

No. 827,632. PATENTED JULY 31, 1906.
H. S. HART, O. W. MEISSNER & J. O. NEIKIRK.
RAILWAY CAR.
APPLICATION FILED MAR. 8, 1905.

Witnesses:

Inventors:
Harry Stillson Hart,
Otto William Meissner,
John Oscar Neikirk,
By Thomas F. Sheridan
Att'y

UNITED STATES PATENT OFFICE.

HARRY STILLSON HART, OTTO WILLIAM MEISSNER, AND JOHN OSCAR NEIKIRK, OF CHICAGO, ILLINOIS, ASSIGNORS TO RODGER BALLAST CAR COMPANY, OF CHICAGO, ILLINOIS, A CORPORATION OF ILLINOIS.

RAILWAY-CAR.

No. 827,632.   Specification of Letters Patent.   Patented July 31, 1906.

Application filed March 8, 1905. Serial No. 248,977.

*To all whom it may concern:*

Be it known that we, HARRY STILLSON HART, OTTO WILLIAM MEISSNER, and JOHN OSCAR NEIKIRK, citizens of the United States, residing in Chicago, county of Cook, and State of Illinois, are the joint inventors of certain new and useful Improvements in Railway-Cars, of which the following is a specification.

Our invention relates principally to that class of convertible cars having swinging bottom sections adapted to form flat bottom portions in one position and inclined hopper portions in another position and having longitudinal sill mechanism so disposed and so connected with suitable body-bolster mechanism as to form a framework having the desired strength and adapted to permit the hopper portion of the car to extend downward between the inner longitudinal sills.

The principal object of our invention is to provide a simple, economical, and efficient railway-car.

A further object is to provide suitable body-bolsters and a suitable and efficient supporting-framework for a railway-car.

A further object is to provide a convertible car having swinging bottom sections forming flat bottom portions for the car in one position and forming inclined hopper portions in another position, such swinging bottom sections being provided with and formed in part by longitudinal beams which swing therewith into position centrally of the car to support the load upon the flat bottom and into position along the sides of the car to form side supports for the load when the car is used as a hopper-car.

A further object of the invention is to provide a railway-car having a supporting-framework comprising side and intermediate longitudinal sills and suitable body-bolsters secured to such side and intermediate sills and to the draft-sills, such bolsters being provided with a bottom plate extending beyond at least one side of the bolster, so as to form a transverse beam member integral with the bolster and operatively connected with the draft-sills.

A further object of the invention is to provide a car having side and intermediate longitudinal sills and side stakes with suitable means for strengthening the side stakes and distributing the breaking strains to which they are subjected in use.

A further object is to provide means whereby the swinging bottom sections, which form flat bottom portions in one position and inclined hopper portions in a second position, may have their upper surface extending at an incline into position flush with the inner surface of the side frames, so as to provide no points for lodgment of the load at their points of engagement with the side frames.

A further object is to provide suitable transverse end frame or partition mechanism adapted to extend from side frame to side frame in vertical position when desired and in inclined position when desired, so as to form inclined hopper portions when in inclined position, whereby the capacity of the car may be restricted or increased, as desired, such adjustable end portions being provided with suitable means for forming inclined extensions of the inclined side hopper portions to close the space which would otherwise exist between such inclined ends and inclined hopper sides.

A further object is to provide in a car adapted to be converted into a flat-bottom gondola car or into a hopper-car suitable side frames having side dumping-doors for enabling the load to be dumped over the sides of the flat bottom portions and having suitable means for securing such side dumping-doors in closed position and enabling them to be readily released.

Other and further objects of the invention will appear from an examination of the drawings and the following description and claims.

The invention consists in the features, combinations, and details of construction hereinafter described and claimed.

In the accompanying drawings, Fig. 22, a sectional plan view of one end of the frame of a car provided with our improved body-bolster, showing the manner of securing it to the draft and longitudinal side and intermediate sills and also showing the bottom plate extending beyond the side of the bolster to form a transverse beam in connection with the bolster; Fig. 23, a side elevation of our improved body-bolster and Fig. 24 a central transverse sectional elevation of the body-bolster shown in Fig. 23.

Figures 22, 23, 24:
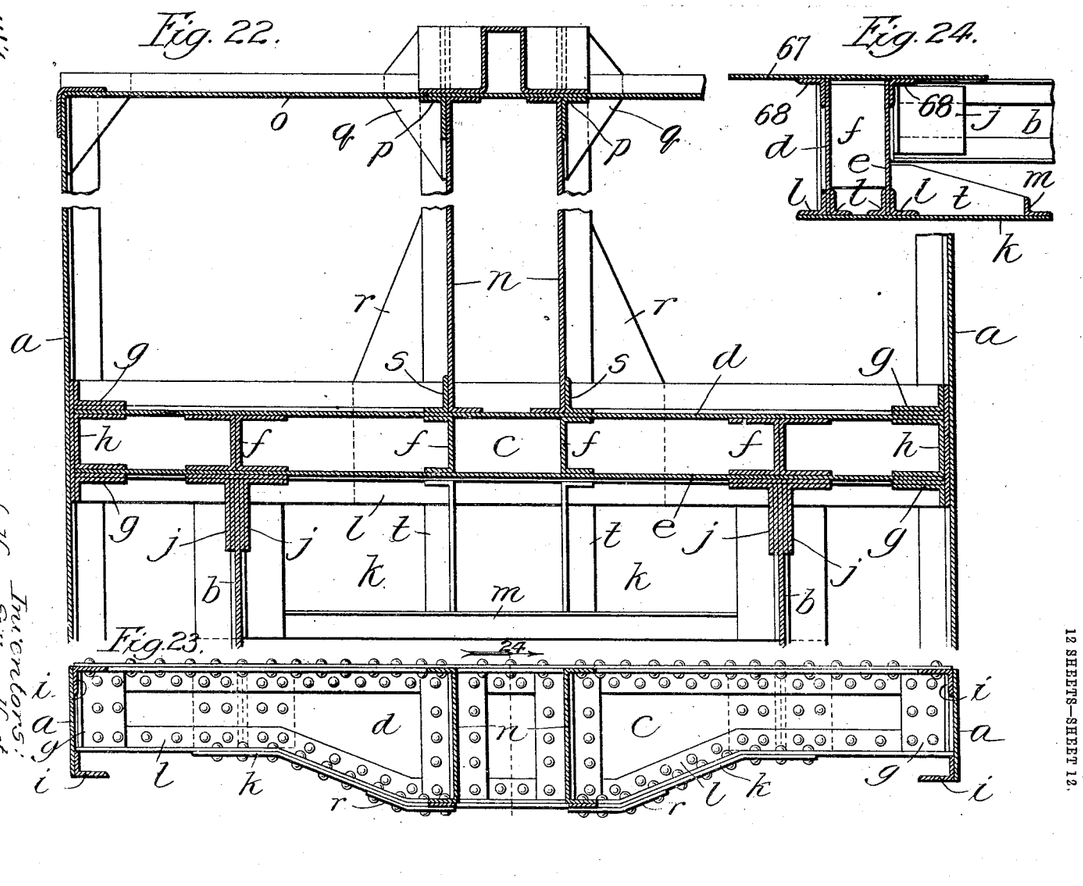

In constructing a convertible car in accordance with our improvements we provide a supporting-framework comprising longitudinal sills $a$ and intermediate longitudinal sills $b$, the side sills being formed of U-beams and the intermediate sills of I-beams. A body-bolster $c$ is provided at each end of the car, formed of vertical side portions $d$ and $e$, extending across the car from side sill to side sill and having connecting stiffeners or knees $f$ arranged at intervals therebetween, such bolster being secured to the side sills by means of securing plates or angles $g$, $h$, and $i$. The bolsters are each secured to the intermediate sills by means of angles $j$ and a bottom cover-plate $k$. This bottom cover-plate extends outward beyond one side of the body-bolster, as shown in Fig. 22, and is inclined upwardly toward its opposite ends and the ends of the bolster to conform to the contour of the under side of the bolster, which is inclined downwardly and inwardly toward its center, so that its side portions have their greatest depth at the center, as shown in Fig. 23. This bottom plate is secured to the bolster by means of angle-irons $l$ and has at its outer edge an angle-iron $m$, forming a vertical flange portion. The bottom plate being thus dished or inclined longitudinally and provided with an angle-iron extending longitudinally of the bolster forms with the bolster a transverse beam member adapted to greatly strengthen the underframing both vertically and horizontally. It is firmly secured both to the body-bolster proper and to the intermediate sills by means of rivets or in any ordinary and well-known manner.

Figure 4:
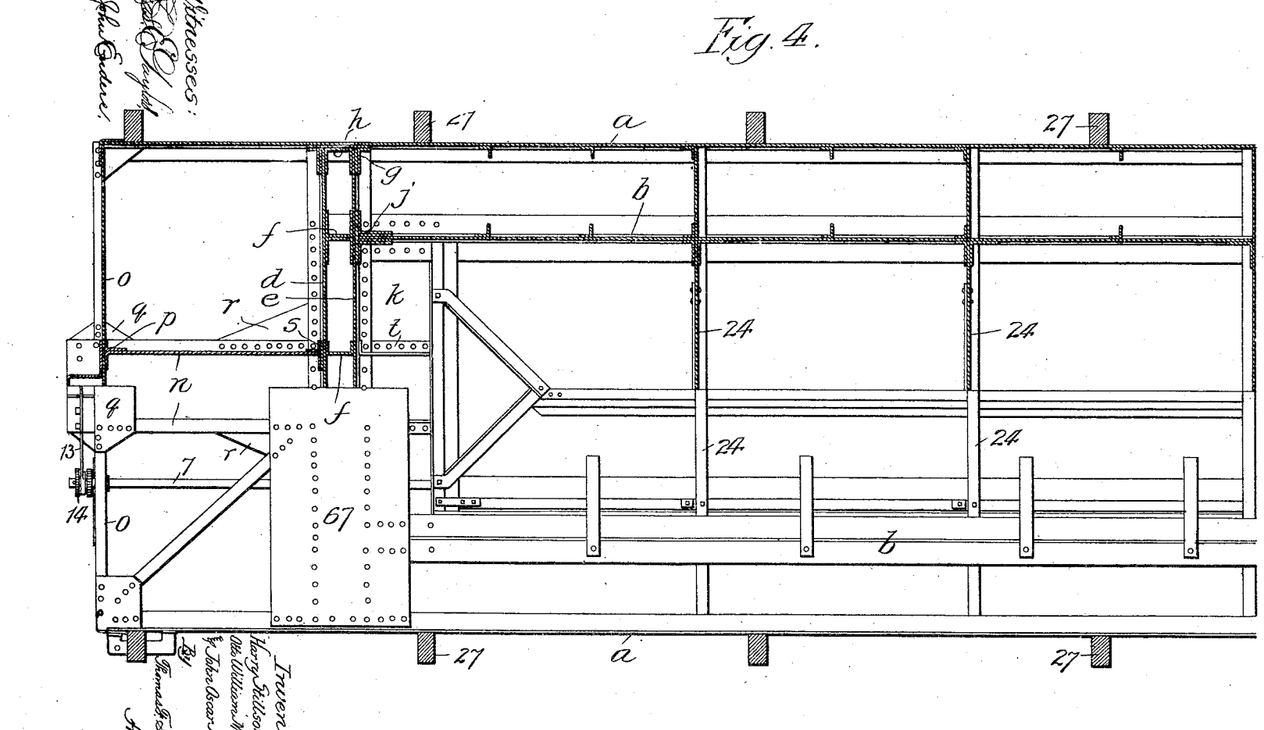
Fig. 4, a sectional plan view taken on line 4 of Fig. 2, showing on the lower side of the figure a plan view of the supporting-framework and on the upper side a sectional plan view taken through the framework at a point indicated by the line 4ᵃ on Fig. 2.

A flat top plate 67 extends over and is secured to the side members of the bolster, as shown in Fig. 4, by means of angles 68 and to the side and intermediate sills and draft-sills on opposite sides of the bolster, thus forming a rigid connection between such parts.

Draft-sills $n$ are secured to end sills $o$ by means of suitable angles $p$ and gusset-plates $q$ and to the bolster by means of gusset-plates $r$ and angles $s$, all of which are firmly riveted together. The gusset-plates $r$ are also secured to the curved or fish-belly bolster bottom plate $k$, already described, by means of suitable rivets. This bottom plate is also further strengthened by means of angle-irons $t$, which extend transversely thereof and are riveted thereto and to the bolster proper. By this arrangement it will be seen that the body-bolsters are so connected with the draft-sills and with the intermediate and side sills as to form in connection therewith a very rigid supporting-framework adapted to resist the great stress and strains to which such parts are subjected in use and that the bottom plate serves not only to secure the bolster to the intermediate sills, but also serves as a transverse beam member to greatly strengthen the supporting-framework, of which it thus becomes an important member.

Figure 5:
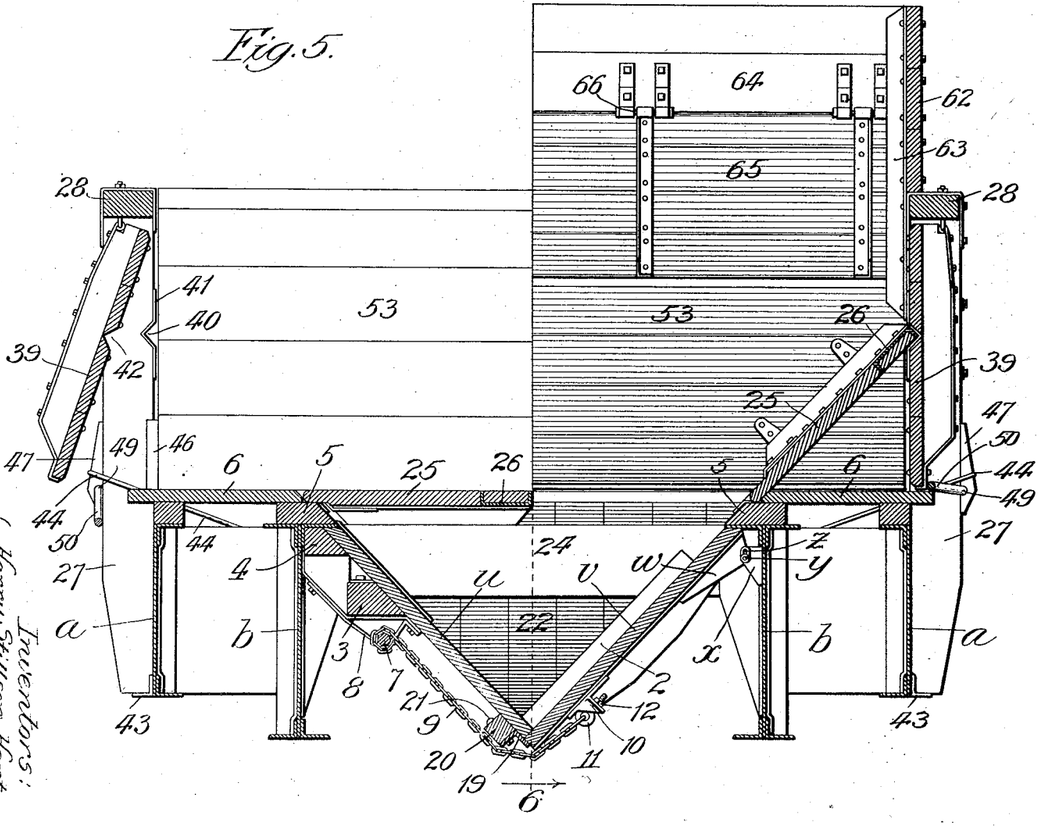
Fig. 5, a cross-sectional elevation taken on line 5 of Fig. 2 looking in the direction of the arrow and showing the opposite end of the car, the supplementary top frame being removed from the left side of the figure and the swinging bottom sections in position to form a flat-bottom gondola car, and the righ -hand side of the figure showing the supplementary top frame in position and the swinging bottom sections in raised inclined position to form a hopper-car.

It is very desirable in a car of this description to provide suitable means whereby it may be employed as a hopper-car when desired or as a flat-bottom gondola car and whereby the contents of the car when it is employed either as a flat-bottom gondola or as a hopper-car may be dumped in an efficient manner. In order to accomplish these purposes and others which will be readily appreciated by those skilled in the art, the intermediate sills are mounted at a sufficient distance from each other to admit a central hopper portion formed of an inclined hopper side $u$ and swinging dumping-door mechanism $v$, pivotally secured to the car-frame by means of hinges composed of hinge members $w$ and $x$ and pivots $y$, mounted in elongated slots or perforations $z$, as shown in Fig. 5. The dumping door or doors of the hopper are provided with strengthening-angles 2, and the rigid inclined hopper portion is secured to the framework of the car by means of nailing-strips 3 and 4, suitable nailing-strips 5 being provided along the upper edge of the hopper at the floor-level, upon which flat side floor portions 6 are secured. The flat floor portions extend from the edges of the hopper to the side frames over the intermediate longitudinal sills.

In order to provide suitable means for operating the dumping-doors $v$, already described, a suitable shaft 7, which extends longitudinally of the car, is rotatably mounted in brackets 8 between the intermediate longitudinal sills and preferably between the rigid inclined side hopper portion and the next adjacent intermediate sill, as shown in Fig. 5, and a plurality of chains 9 are secured to such shaft so as to be wound thereon by the rotation of the shaft, their ends being adjustably secured to the hopper-doors $v$ by means of brackets 10, having perforations in which I-bolts 11 are mounted and adjustably secured by means of nuts 12. The ends of the chains are each directly secured to one of these I-bolts. The length of the chain may thus be readily adjusted by turning the nuts in either direction, as desired.

Figure 1:
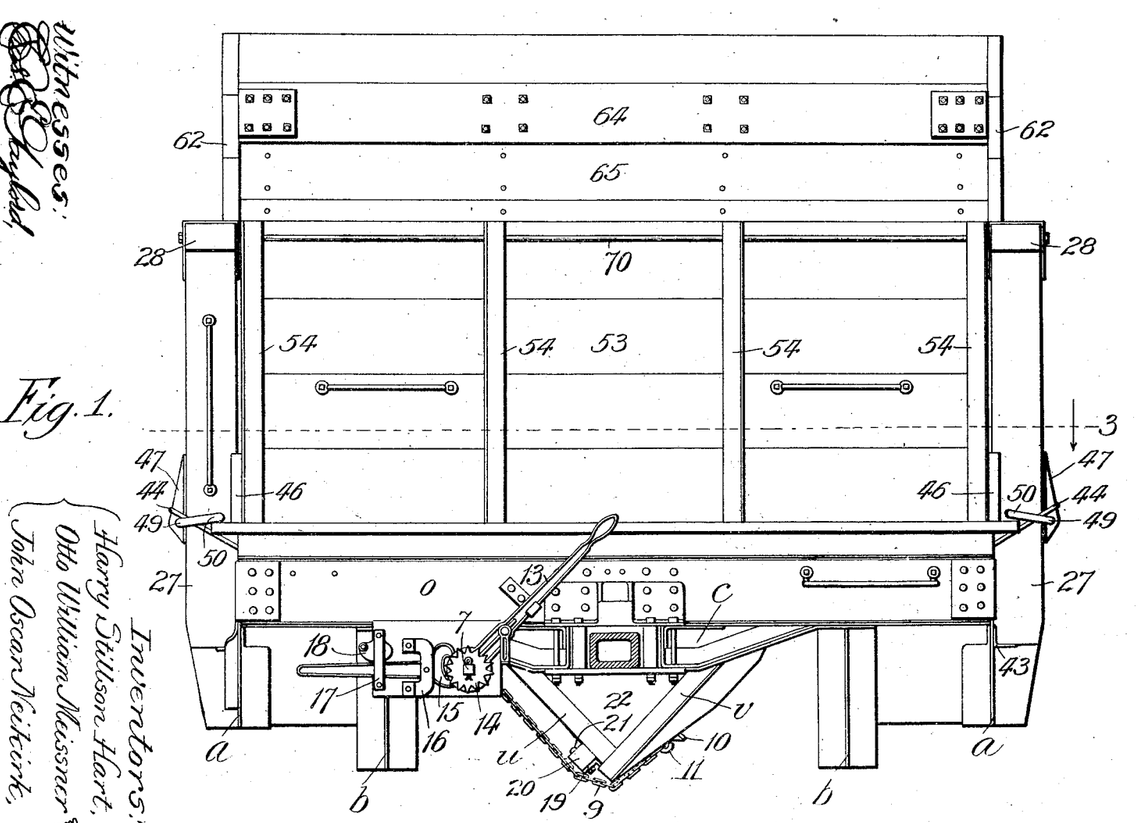
Figure 1 is an end elevation of a car constructed in accordance with our improvements.

Suitable means is provided for operating the operating-shaft, and thereby the dumping door or doors. For this purpose a lever 13 is mounted upon the rotatable shaft 7 and provided with pawl-and-ratchet mechanism comprising a ratchet 14 and a pawl or pallet member 15, mounted in a bracket 16 and guide 17 and having a securing-cam 18, as shown in Fig. 1.

In order to provide a tight joint between the bottom of the rigid inclined hopper portion and the hopper-door, an angle-iron 19 is secured to the lower edge of the rigid inclined hopper portion by means of a strip 20, to which such angle is secured by means of bolts or rivets 21, so as to extend downward from the lower edge of the inclined hopper portion, forming therewith an angular portion in engagement with the lower edge of the dumping-door when such door is in closed position. Fixed inclined lower hopper end portions 22 extend at an incline over a portion of the trucks (not shown) and downward between supporting-wheels 23, completing the lower portion of the hopper.

Figure 3:
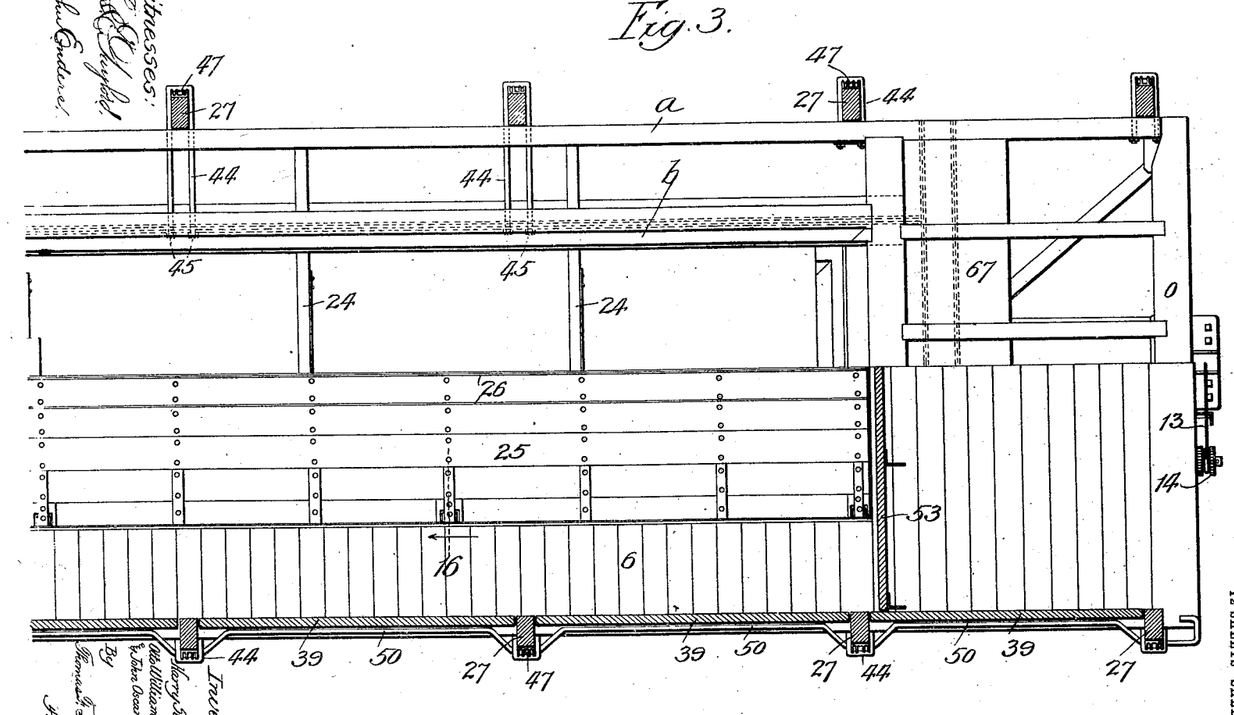
Fig. 3, a sectional plan view taken on line 3 of Fig. 1 looking in the direction of the arrow, the lower side showing the hopper and floor portions and the upper side having the hopper and floor portions removed so as to show the underframe in plan view.
Figure 8:
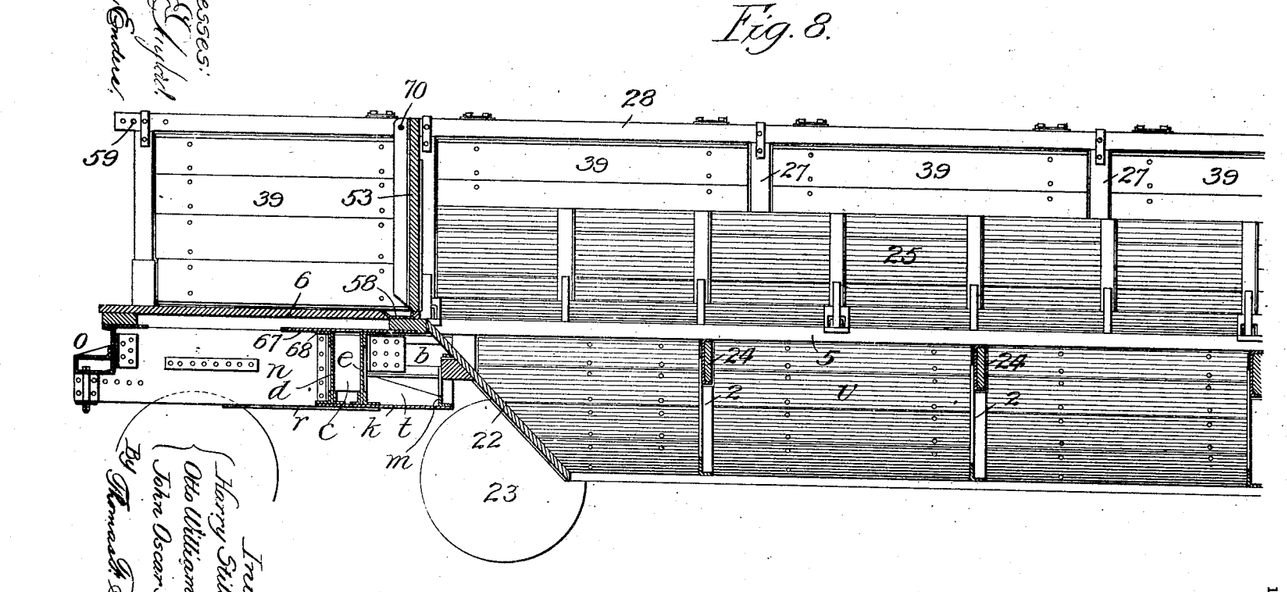
Fig. 8, a similar view showing the adjustable transverse end frame or partition portions extending vertically from the top of the fixed hopper portion in position to limit the capacity of the car.

Transverse beams or bearers 24 extend transversely of the car, as shown in Figs. 3 and 8, and are secured to the longitudinal sills forming part of the supporting-framework.

Swinging bottom sections 25 are hinged to the car-frame along the upper edges and at each side of the inclined hopper portion already described, each of such swinging sections being provided at its inner edge with a metallic channel-beam 26, secured thereto and forming a part thereof. These swinging bottom sections are adapted to be swung into horizontal position, as shown at the left of Fig. 5, and when they are in this position a flat bottom is provided having central beam portions 26 resting upon transverse beams 24 for supporting the weight of the load upon such swinging sections. They are also adapted to be swung into raised inclined position, as shown at the right of Fig. 5, and when in this position the longitudinal beams 26 form side beams which support the load at the side of the car, and the swinging bottom sections when in this position form inclined hopper portions. These swinging bottom sections are pivotally secured along the opposite upper edges of the hopper by means of hinges. Each of these hinges consists of a hinge member 29, secured to the framework or hopper and having an inclined body portion 30, which extends over the edge of the hopper, such hinge member being provided with upwardly-extending lugs 31, each having a vertical elongated perforation 32 therein for receiving a bolt or pivot 33, and a second hinge member 34 is secured to the swinging bottom section, having slots 35 for receiving the upwardly-extending lugs of the opposite hinge member and slots 36 for receiving the tongue portions 37 of the swinging bottom sections. These last-mentioned hinge members are provided with suitable perforations for containing the bolts or pivots 33, already described. These hinge members are secured to the swinging sections by means of metal straps 38. By this means sufficient play is permitted between the pivot of the hinge and the lugs having the elongated slots so that in case material becomes lodged between the edge of the swinging section and the framework or hopper the swinging section can nevertheless be raised or lowered without danger of breaking the hinges or injury to the swinging sections.

Side stakes 27 are secured to the side sills and extend upward above the floor-level the desired distance to form suitable side supports for the side frames, of which they form a part. They are provided at their upper ends with connecting-sills 28, which extend longitudinally of the car, forming fixed continuous upper side frame portions, beneath and pivotally secured to which are mounted swinging side frame-sections or side dumping-doors 39. These side stakes are provided with notches 40, having notch-straps for supporting the upper edges of the swinging bottom sections and forming suitable recesses or notches in the inner surfaces of the side frames, which permit the swinging bottom sections to enter such recesses, so that their upper surfaces are inclined at points flush with the inner surfaces of the side frames. The inclined swinging bottom sections are thus adapted to dump the inner portion of the load resting thereon, and they afford no points for lodgment of the load. The side dumping-doors are also provided with notches 42 therein for the same purpose mentioned in connection with the notches in the side stakes. The notch-straps 41 of the side stakes, however, serve to support the upper edges of the swinging bottom sections and the longitudinal beam portions thereof when in raised inclined position.

Figures 9, 10, 11, 12:
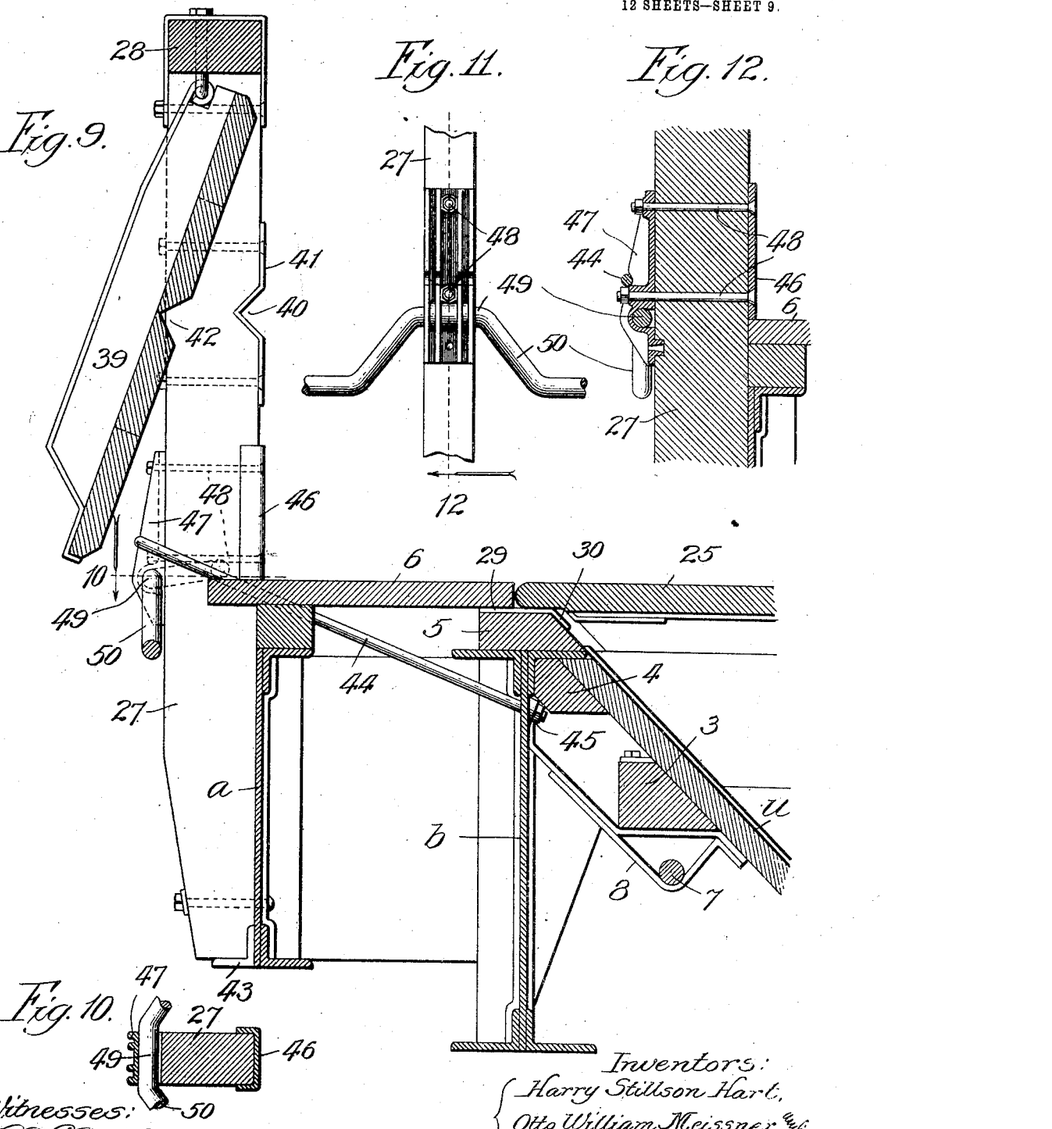
Fig. 9, a transverse sectional elevation of a fragment of the car, showing in detail the manner of connecting the side stakes with the longitudinal sills, the view being similar to that at the left side of Fig. 5.
Fig. 10, a plan sectional detail of one of the side stakes, taken on line 10 of Fig. 9, showing the side-stake cheek-plate and the rock-shaft supporting bracket in section.
Fig. 11, a detail view in elevation, showing the rock-shaft supporting bracket mounted upon one of the side stakes and the rock-shaft for securing the doors mounted in such bracket.
Fig. 12, a sectional elevation of the parts shown in Fig. 11.

In order to provide suitable means for firmly connecting the side stakes to the supporting-framework, such stakes, as already suggested, extend downward along the outer side of the side sills and are firmly secured thereto, and suitable angle-irons 43 may be provided at the lower end of the side stakes and secured to the lower end of the side sills. A U strap or bolt 44 extends around each side stake and has its inner ends secured either to one of the intermediate sills b, as shown in Fig. 9, by means of nuts 45 or to the outer side sill in the same manner if the side stake happens to be at a point between the end of the car and the end of the intermediate sills.

In order to distribute the breaking strain upon the side stakes and to provide means for protecting them against the wearing effects of using plows in dumping the load through the side doors, suitable cheek-plates 46, U-shaped in cross-section, are mounted upon the inner side of the side stakes, and brackets 47 are mounted upon the outer sides of such side stakes, both secured in position by means of bolts 48.

Figure 2:
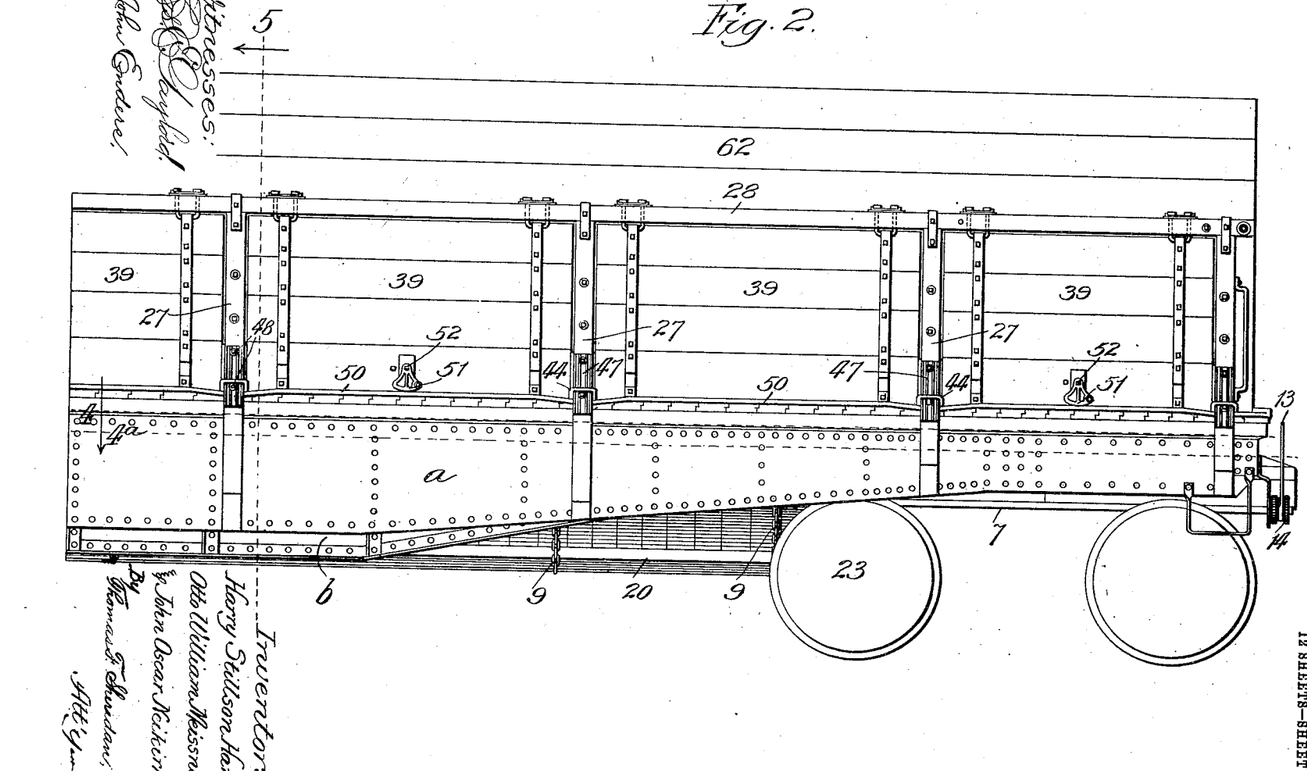
Fig. 2, a side elevation of one end of the car shown in Fig. 1.
Figures 13, 14:
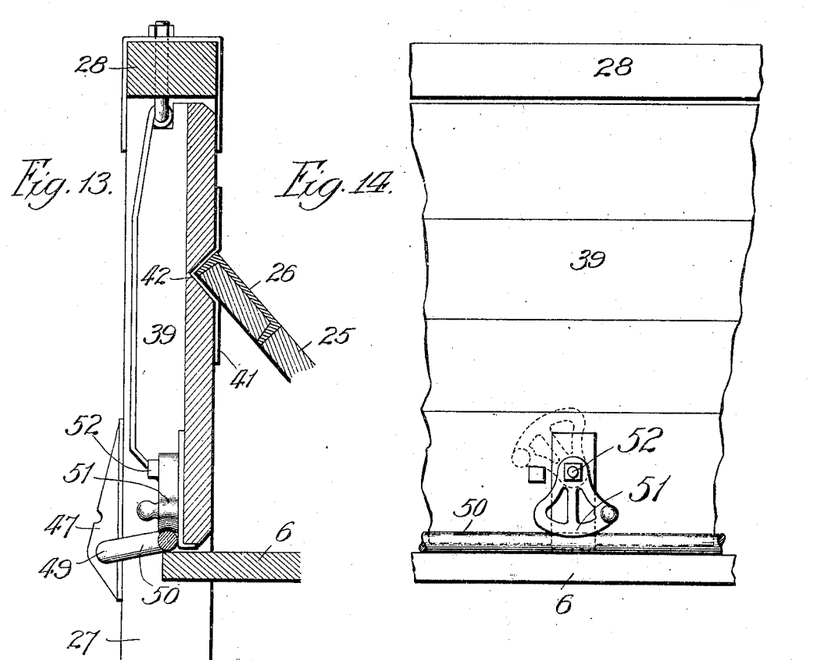
Fig. 13, a detail sectional elevation of a fragment of the car, showing the securing-cam for holding the rock-shaft, and thereby the side dumping-doors, in closed position.
Fig. 14, a side view of the parts shown in Fig. 13, showing the rock-shaft secured in locking position by the securing-cam.
Figure 15:
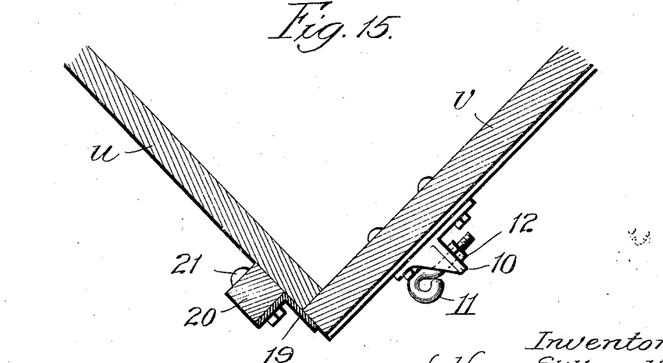
Fig. 15, a cross-sectional elevation of a fragment of the car, showing the tight joint between the hopper-door and the rigid side hopper portion and the means for adjustably securing the chain to the hopper-door.
Figure 16:
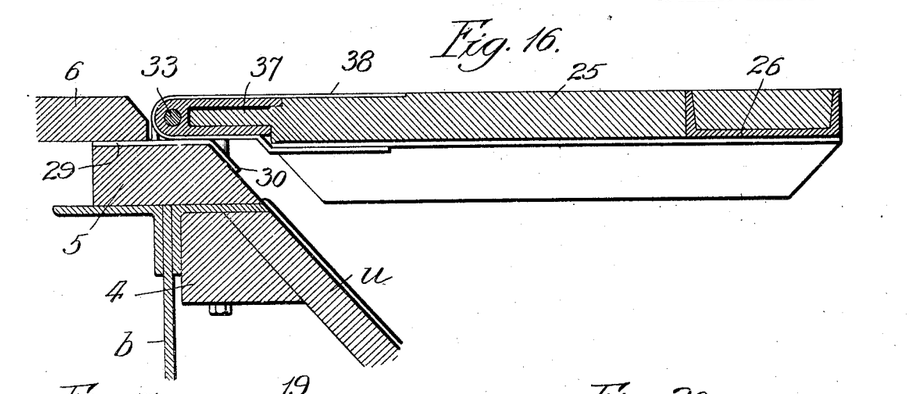
Fig. 16, a transverse sectional view in elevation of a fragment of the car, taken on line 16 of Fig. 3 looking in the direction of the arrow, showing one of the hinges of the swinging bottom sections and one of the channel-beams which form portions of such swinging sections.
Figure 17:
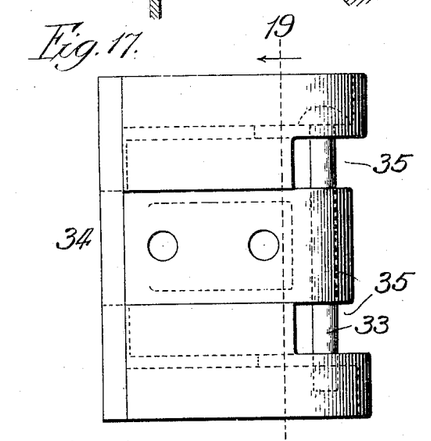
Fig. 17, a detail plan view of the hinge member which is secured to the swinging bottom section shown in Fig. 16.
Figure 18:
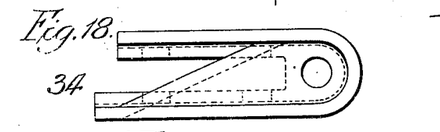
Fig. 18, a side elevation of the hinge member shown in Fig. 17.
Figure 19:
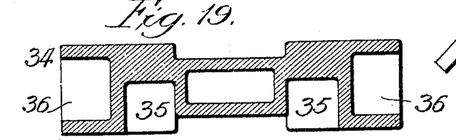
Fig. 19, a sectional elevation of the hinge member, taken on line 19 of Fig. 17.
Figure 20:
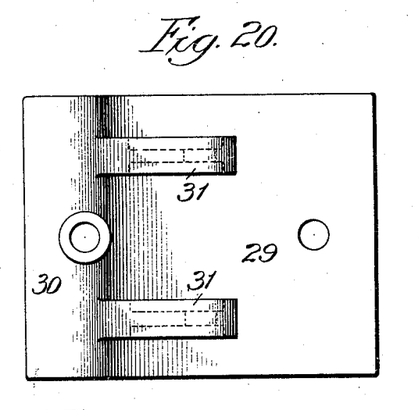
Fig. 20, a plan view of the other hinge member shown in Fig. 16 secured to the car-frame or hopper.
Figure 21:
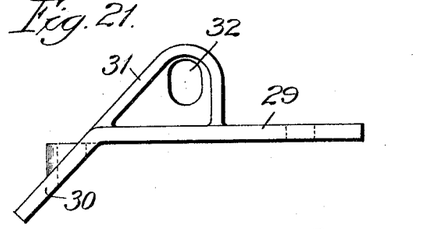
Fig. 21, a side elevation of the hinge member shown in Fig. 20.

In order to provide suitable means for holding the side dumping-doors in closed position and permitting them to be readily opened, a rock-shaft 49 is mounted just beneath the edge of each of such side doors so as to extend along the outer edge of the side stakes longitudinally of the car. These rock-shafts are rotatably mounted in the brackets 47, already described, and are provided with crank portions 50 of sufficient length to reach from their pivotal points into engagement with the lower edge of the side dumping-doors when they are in closed position. The swinging side frame-sections are thus secured in position to be readily released. For removably securing the rock-shafts in locking position, securing-cams 51 are mounted at intervals along the outside and lower edges of the side dumping-doors upon suitable pivots 52. (See Figs. 2, 13, and 14.) These securing-cams are swung into position shown in full lines in Fig. 14 to hold the shaft in locking position and into position shown in dotted lines in said figure for releasing the shaft, and thereby the side dumping-doors.

Figure 6:
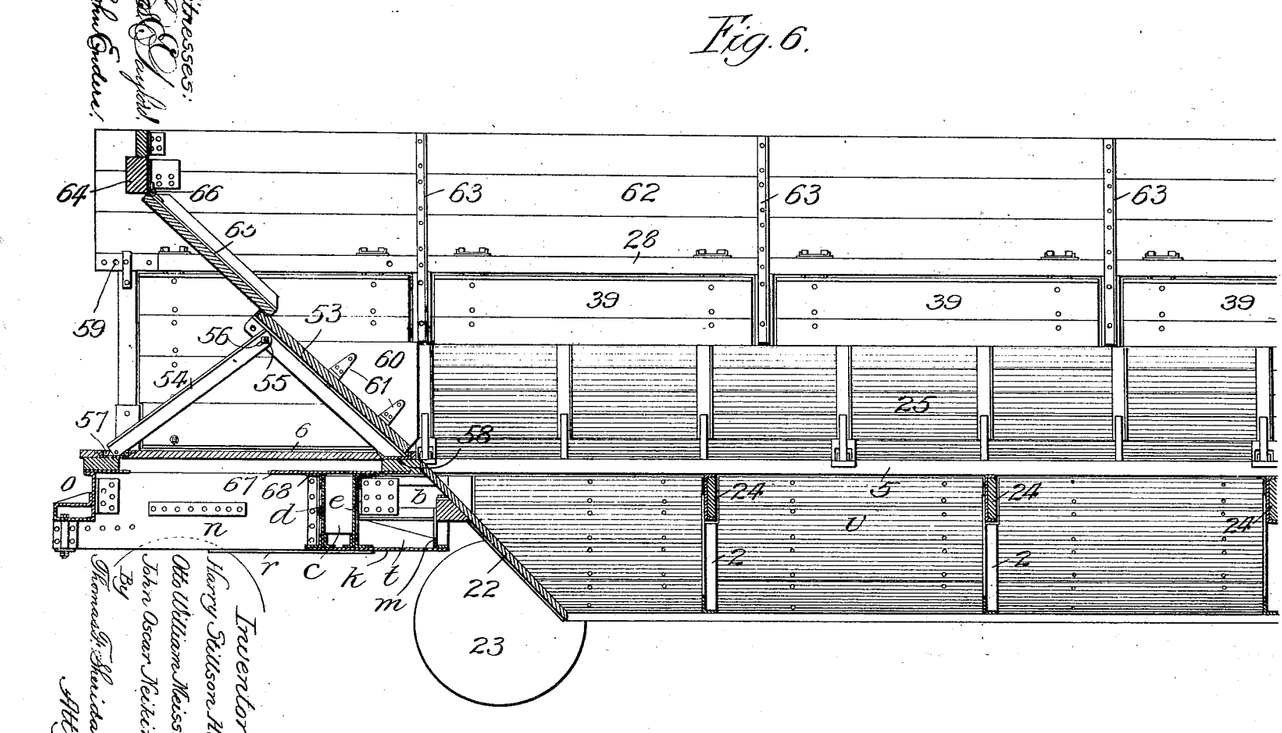
Fig. 6, a longitudinal sectional elevation taken on line 6 of Fig. 5 looking in the direction of the arrow and showing the parts in the position shown at the right side of Fig. 5.

It is very desirable to provide suitable means whereby the capacity of the car may be restricted or increased, as desired, and whereby when the car is used as a hopper-car the largest possible proportion or the entire contents thereof may be dumped. In order to accomplish this, adjustable transversely-extending end frames 53 are mounted between the side frames of each end of the car, movable into vertical position, as shown in Fig. 8, substantially at the end of the lower fixed hopper portion for restricting the capacity of the car when in such position. They are also adapted to be mounted in inclined position so as to extend at an incline from a point back of the fixed hopper portion downward at an incline to the upper edge of such fixed hopper portion, as shown in Fig. 6. These transversely-extending adjustable end frames are held in the position shown in Fig. 6 by means of legs 54, pivotally secured to the upper portion thereof by means of removable bolts or pivots 55, which enter elongated slots 56. The lower ends of these legs may be pivotally mounted at the end of the car above metallic sockets 57, so that when the end frames are in inclined position projecting portions of their lower edges will extend into similar metallic sockets 58 at the upper edge of the fixed hopper portions, and the legs will thus be at the desired incline to support the end frames in such position.

When the adjustable end frames are in the position shown in Fig. 8 to limit the capacity of the car, the legs 54 may be separated therefrom by removing bolts 55, or they may be folded against the back of such frames. The frames are held in this position by means of rods 70, extending through perforations in the side frames and across the back of the adjustable frames. When mounted in the position shown in Fig. 7, so as to increase the capacity of the car to the greatest possible extent, the legs are folded at the back thereof, and the projections on the lower edges extend into the sockets 57, the rods 70 being placed in perforations 59 back of and in engagement with the end frames near the upper edge thereof. In this position the end frames engage the corner-posts and are thus securely held in position. These adjustable end frame portions are each provided with a pair of flaps or foldable gusset-plates 60, hinged to the opposite side edges thereof by means of hinges 61, such flaps being substantially triangular in form, so that their upper edges rest against the side frames proper when the adjustable end frames are in inclined position and thus close the space which would otherwise exist between the adjustable end frames and the ends of the swinging bottom sections which form the upper inclined portions of the hopper sides. These flaps or gusset-plates 60 are bolted against the transverse end frames when not in use.

Figure 7:
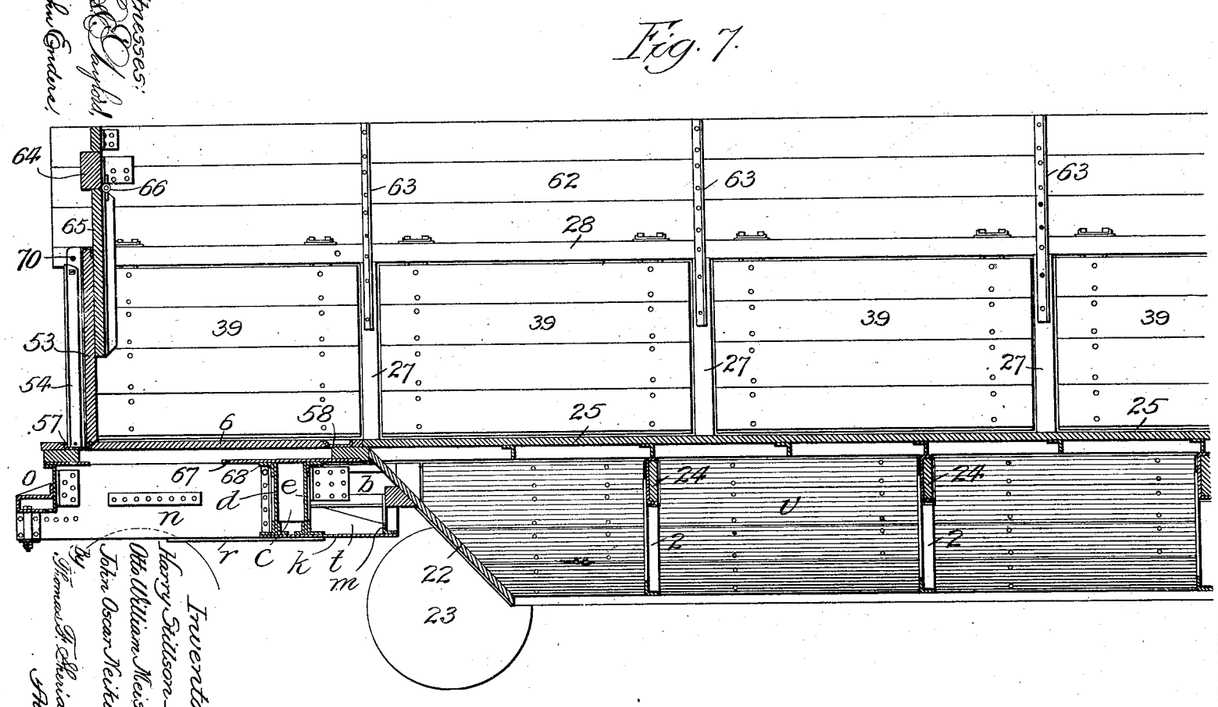
Fig. 7, a similar view showing the portions of the car illustrated in Fig. 6, the adjustable transverse end portions being in vertical position to give the car its largest capacity.

In order to enable the capacity of the car to be increased to its utmost, a top supplementary frame, comprising supplementary side frames 62, having stakes 63, which may be secured to the side stakes proper by means of bolts or in any desired known manner, and also comprising supplementary end frame portions 64, having swinging end frame-sections 65, secured to the upper portions thereof by means of hinges 66, is provided and mounted upon the top of the permanent side and end frames. The swinging portion 65 of these supplementary end frames extends downward and inward at an incline to the upper edge of the transverse end frames 53, already described, when in one position, so as to provide an inclined hopper end which reaches entirely from the end of the car to the hopper-outlet when the supplementary frames are in position. The car thus has the largest possible capacity consistent with the dumping of the entire load automatically. These swinging end portions of the top or supplementary frame are also adapted to be arranged in vertical position, as shown in Fig. 7, when the largest possible capacity of the car is to be obtained, thus forming with the end frame proper substantially vertical ends which extend upward to the top of the supplementary frame and down to the level of the flat door portions at the ends of the car.

The car is thus adapted to be converted into a flat-bottom car or into a hopper-car when the supplementary top frames or boards are in use, as well as when they are not employed, and the capacity of the car as a dump-car and also as a flat-bottom or partially-flat-bottom car is capable of being diminished or increased to the greatest possible degree.

When desirable, the transverse adjustable end frames may be lowered from inclined to horizontal position by folding the supporting-legs against the backs of such end frame members, and this will leave the ends of the hopper open down to substantially the floor-level when the hopper is in use. This is sometimes desirable for hauling rails and the like.

We claim—

1. In a railway-car, the combination of side and intermediate sills, body-bolsters connected with the side sills and having side members extending transversely across the car from side sill to side sill and connected with the ends of the intermediate sills, draft-sills at each end of the car connected with such body-bolsters respectively, and a bottom plate extending transversely beyond the side of each of such body-bolsters and secured to the intermediate sills.

2. In a railway-car, the combination of side and intermediate sills, body-bolsters connected with the side sills and having side members extending transversely across the car from side sill to side sill and connected with the ends of the intermediate sills the lower edges of which side members extend downward at an incline toward their longitudinal centers, and a bottom plate secured to the bottom of such bolster extending transversely beyond the side thereof and upward and outward at an incline longitudinally thereof.

3. In a railway-car, the combination of side and intermediate sills, body-bolsters connected with the side sills and having side members extending transversely across the car from side sill to side sill and connected with the ends of the intermediate sills the lower edges of which side members extend downward at an incline toward their longitudinal centers, a bottom plate secured to the bottom of such bolster extending transversely beyond the side thereof and upward and outward at an incline longitudinally thereof, and a top plate extending transversely beyond the side of such bolster and secured to the intermediate sills.

4. In a railway-car, the combination of side and intermediate sills, body-bolsters connected with the side sills and having side members extending transversely across the car from side sill to side sill and connected with the ends of the intermediate sills the lower edges of which side members extend downward at an incline toward their longitudinal centers, a bottom plate secured to the bottom of such bolster extending transversely beyond the side thereof and upward and outward at an incline longitudinally thereof, a top plate extending transversely beyond the side of such bolster and secured to the intermediate and side sills, and gusset-plates extending transversely beyond the sides of the draft-sills and secured to such draft-sills and to the bottom of such body-bolster.

5. In a railway-car, the combination of side and intermediate longitudinal sills, body-bolsters extending transversely of the car connected with such side sills and having upright side portions, draft-sills secured to one side of each of such body-bolsters, a bottom plate secured to the other side thereof extending transversely of the bolster beyond its upright side member and secured to the intermediate longitudinal sills, and an angle-iron secured to the edge of such bottom plate extending transversely of the car.

6. In a railway-car, the combination of side and intermediate longitudinal sills, a body-bolster provided with upright side portions extending from side sill to side sill and having their lower edges inclined downwardly toward the longitudinal center of the bolster, and a bottom plate extending transversely beyond the side of the bolster, such plate being inclined upwardly and outwardly toward its opposite ends and the ends of the bolster and secured to the bolster and to the intermediate sills.

7. In a railway-car, the combination of side and intermediate longitudinal sills, a body-bolster having upright side portions extending from side sill to side sill the lower edges of which side portions are inclined downwardly toward the longitudinal center of the bolster, a bottom plate inclined upwardly and outwardly toward its opposite ends and the ends of the bolster secured to the bolster and to the intermediate sills and extending transversely of the bolster beyond the upright side portion thereof, and a top plate extending beyond the upright side portions of the bolster and secured on opposite sides thereof to the longitudinal sills and draft-sills.

8. In a railway-car, the combination of a supporting-framework provided with a lower hopper portion, a plurality of swinging bottom sections pivotally mounted and extending at an incline above such lower hopper portion forming inclined hopper portions in one position and movable to substantially horizontal position to form flat bottom portions over the hopper, and channel-beams secured to the swinging edges of such swinging bottom sections and forming a part of the load-sustaining portion of the swinging section.

9. In a railway-car, the combination of a supporting-framework provided with a lower hopper portion, swinging bottom sections pivotally mounted on opposite sides of such lower hopper portion movable into load-supporting position over the hopper and into inclined position laterally of the hopper, and side frames provided with recesses for receiving the upper edges of the swinging sections.

10. In a railway-car, the combination of a supporting-framework provided with a lower hopper portion, swinging bottom sections mounted on opposite sides of such lower hopper portion each provided with a beam extending along its swinging edge and movable therewith into load-supporting position over the hopper and into inclined position laterally of the hopper, and side frames provided with recesses for receiving the upper edges of the swinging sections formed by such beams.

11. In a railway-car, the combination of a supporting-framework provided with a central hopper portion and having side and end frames, swinging bottom sections mounted on opposite sides of the hopper, and a plurality of hinges for pivotally securing the swinging sections in position each having a hinge member provided with upwardly-extending lugs having vertically-elongated perforations therein, and a hinge member provided with a pivot extending through the elongated slots in lugs.

12. In a railway-car, the combination of a supporting-framework provided with a hopper extending longitudinally thereof and having inclined side portions, fixed horizontal floor portions extending from each end of the hopper to the end of the car, and transverse end frame members extending across opposite ends of the hopper and movable into and out of inclined position.

13. In a railway-car, the combination of a supporting-framework provided with side and fixed end frames, a central hopper, fixed bottom portions extending from each fixed end frame to the hopper, swinging bottom sections pivotally mounted on opposite sides of such hopper movable to horizontal and inclined raised positions, and movable transverse end frame portions mounted between the ends of the hopper and the adjacent ends of the car and movable to upright and inclined positions.

14. In a railway-car, the combination of a supporting-framework provided with side and end frames, a central hopper, fixed end frames, fixed floor portions extending from such end frames to the ends of the hopper, swinging bottom sections pivotally mounted on opposite sides of such hopper movable to horizontal and inclined raised positions, movable transverse end frame portions mounted between the ends of the hopper and the adjacent ends of the car and movable to upright and inclined positions, and means for supporting such movable end frame portions in vertical position at the end of the hopper to limit the capacity of the car and in inclined position to form inclined hopper portions.

15. In a railway-car, the combination of a supporting-framework provided with side and end frames, a central hopper, swinging bottom sections pivotally mounted on opposite sides of such hopper movable to horizontal position to form flat bottom portions and to inclined position to form inclined hopper portions, adjustable transverse end frame members mounted between the ends of the hopper and the adjacent ends of the car movable to upright and inclined positions and each provided with a plurality of flaps hinged thereto extending from such transverse end frame member to the inclined swinging bottom sections when such transverse end frame members are in inclined position.

16. In a railway-car, the combination of a supporting-framework provided with side and end frames, a central hopper, swinging bottom sections pivotally mounted on opposite sides of such hopper movable to horizontal position to form flat bottom portions and to inclined position to form inclined hopper portions, lower adjustable transverse end frame portions mounted between the ends of the hopper and the adjacent ends of the car, and supplementary side and end frames removably mounted above the fixed side frames and provided with adjustable end frame portions movable to inclined position in engagement with the lower adjustable transverse end frames.

17. In a railway-car, the combination of a supporting-framework provided with side and intermediate longitudinal sills, side stakes secured to such framework, cheek-plates mounted upon the inner edges of such side stakes, and U-bolts extending around the side stakes and having their inner ends secured to the intermediate longitudinal sills.

18. In a railway-car, the combination of a supporting-framework provided with side stakes, and metallic cheek-plates extending around the inner edges of such stakes and provided with vertical flange portions extending upon the opposite sides of such stakes.

19. In a railway-car, the combination of a supporting-framework provided with side stakes, metallic cheek-plates mounted upon the inner sides of such side stakes, metallic brackets mounted upon the outer sides of the side stakes opposite the cheek-plates, and bolts connecting the cheek-plates and brackets.

20. In a railway-car, the combination of a supporting-framework provided with side stakes, metallic cheek-plates mounted upon the inner sides thereof, metallic brackets mounted upon the outside of such stakes opposite such cheek-plates and provided with perforations for supporting door-securing mechanism, and U-bolts extending around such metallic brackets above such perforations and secured to the framework of the car.

21. In a railway-car, the combination of a supporting-framework provided with side and intermediate longitudinal sills, side and end frames mounted upon such supporting-framework, side stakes for supporting the side frames, longitudinally-extending side frame portions secured to the upper ends of such side stakes, side dumping-doors pivotally secured at their upper edges to such longitudinally-extending side frame portions, rock-shafts pivotally mounted on a plane below the lower edges of the side dumping-doors and provided with crank portions extending into engagement with such doors when in closed position, and cam mechanism pivotally mounted upon the side dumping-doors movable into and out of engagement with such rock-shafts.

HARRY STILLSON HART.
OTTO WILLIAM MEISSNER.
JOHN OSCAR NEIKIRK.

Witnesses:
ANNIE C. COURTENAY,
ANNA L. SAVOIE.